US012654421B2

(12) United States Patent
Gormley

(10) Patent No.: US 12,654,421 B2
(45) Date of Patent: Jun. 16, 2026

(54) AIRCRAFT COMPONENT WITH FIBER-REINFORCED ELASTIC EXPANSION SECTION

(71) Applicant: Rohr, Inc., Chula Vista, CA (US)

(72) Inventor: Timothy Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 255 days.

(21) Appl. No.: 18/528,192

(22) Filed: Dec. 4, 2023

(65) Prior Publication Data
US 2025/0178307 A1 Jun. 5, 2025

(51) Int. Cl.
B32B 5/02 (2006.01)

(52) U.S. Cl.
CPC .......... B32B 5/02 (2013.01); *B32B 2260/021* (2013.01); *B32B 2260/046* (2013.01); *B32B 2307/51* (2013.01); *B32B 2605/18* (2013.01)

(58) Field of Classification Search
CPC ............... B32B 5/02; B32B 2260/021; B32B 2260/046; B32B 2307/51; B32B 2605/18
See application file for complete search history.

(56) References Cited

U.S. PATENT DOCUMENTS

| | | |
|---|---|---|
| 2,796,731 A | 6/1957 | Morley |
| 3,622,075 A | 11/1971 | Harris |
| 3,721,389 A | 3/1973 | Mackinnon |
| 3,892,358 A | 7/1975 | Gisslen |
| 4,026,105 A | 5/1977 | James |
| 4,132,068 A | 1/1979 | Johnston |

| | | |
|---|---|---|
| 5,076,496 A | 12/1991 | Lippmeier |
| 5,120,599 A | 6/1992 | Lewis |
| 6,622,974 B1 | 9/2003 | Dockter |
| 8,980,395 B2 | 3/2015 | Ash |
| 9,284,914 B2 | 3/2016 | Webster |
| 9,581,145 B2 | 2/2017 | Jasklowski |
| 9,850,776 B2 | 12/2017 | Hurlin |
| 10,266,247 B2 * | 4/2019 | Aliaga ................. B64C 27/473 |
| 10,316,604 B2 | 6/2019 | Naedler |

(Continued)

FOREIGN PATENT DOCUMENTS

| | | |
|---|---|---|
| DE | 2849864 C2 | 8/1982 |

OTHER PUBLICATIONS

EP Search Report for EP Patent Application No. 24217555.2 dated Apr. 11, 2025.

*Primary Examiner* — Joanna Pleszczynska
(74) *Attorney, Agent, or Firm* — Getz Balich LLC

(57) ABSTRACT

An apparatus is provided for an aircraft which includes an aircraft component. The aircraft component includes a first plate section, a second plate section and an elastic expansion section laterally between the first plate section and the second plate section. The elastic expansion section is configured to elastically deform to increase a lateral width between the first plate section and the second plate section. The aircraft component is formed from at least an elastomeric matrix and a fiber layer at least partially embedded within the elastomeric matrix. A bead is formed in the fiber layer laterally between a first portion of the fiber layer and a second portion of the fiber layer. The first portion of the fiber layer is disposed in the first plate section. The second portion of the fiber layer is disposed in the second plate section. The bead is disposed in the elastic expansion section.

18 Claims, 10 Drawing Sheets

(56) References Cited

U.S. PATENT DOCUMENTS

| | | |
|---|---|---|
| 2006/0053767 A1 | 3/2006 | Seiner |
| 2009/0148275 A1* | 6/2009 | Bogue .................. F01D 11/005 |
| | | 415/230 |
| 2010/0000220 A1 | 1/2010 | Chaudhry |
| 2013/0020408 A1 | 1/2013 | Jasklowski |
| 2013/0306755 A1 | 11/2013 | Dittmann |
| 2014/0338324 A1 | 11/2014 | Jasklowski |
| 2015/0000305 A1 | 1/2015 | Jasklowski |
| 2016/0281639 A1 | 9/2016 | Jackowski |
| 2023/0279783 A1 | 9/2023 | Khidekel |

* cited by examiner

AIRCRAFT COMPONENT WITH FIBER-REINFORCED ELASTIC EXPANSION SECTION

BACKGROUND

1. Technical Field

This disclosure relates generally to an aircraft and, more particularly, to an expansion joint for an aircraft structure.

2. Background Information

Many aircraft structures may utilize an expansion joint. Various types and configurations of expansion joints are known in the art. While these known expansion joints have various benefits, there is still room in the art for improvement.

SUMMARY OF THE DISCLOSURE

According to an aspect of the present disclosure, an apparatus is provided for an aircraft which includes an aircraft component. The aircraft component includes a first plate section, a second plate section and an elastic expansion section laterally between the first plate section and the second plate section. The elastic expansion section is configured to elastically deform to increase a lateral width between the first plate section and the second plate section. The aircraft component is formed from at least an elastomeric matrix and a fiber layer at least partially embedded within the elastomeric matrix. A bead is formed in the fiber layer laterally between a first portion of the fiber layer and a second portion of the fiber layer. The first portion of the fiber layer is disposed in the first plate section. The second portion of the fiber layer is disposed in the second plate section. The bead is disposed in the elastic expansion section.

According to another aspect of the present disclosure, another apparatus is provided for an aircraft which includes an aircraft component. The aircraft component includes a first plate section, a second plate section and an elastic expansion section laterally between the first plate section and the second plate section. The elastic expansion section extends longitudinally along the first plate section and the second plate section. The elastic expansion section is configured to elastically deform to increase a lateral width between the first plate section and the second plate section when the aircraft component is placed laterally in tension. The aircraft component is formed from at least an elastomeric matrix and a fiber layer at least partially embedded within the elastomeric matrix. The fiber layer includes a plurality of fibers extending laterally across the elastic expansion section into the first plate section and the second plate section. The fibers includes a first fiber and a second fiber longitudinally adjacent the first fiber. The first fiber is longitudinally spaced from the second fiber at a first lateral intersection between the first plate section and the elastic expansion section by a first longitudinal distance. The first fiber is longitudinally spaced from the second fiber at a second lateral intersection between the second plate section and the elastic expansion section by a second longitudinal distance. The first fiber is longitudinally spaced from the second fiber at location laterally between the first lateral intersection and the second lateral intersection by a third longitudinal distance that is greater than the first longitudinal distance and the second longitudinal distance.

According to still another aspect of the present disclosure, another apparatus is provided for an aircraft which includes an aircraft component. The aircraft component is formed from at least an elastomeric matrix and a sheet of fiber reinforcement at least partially embedded within the elastomeric matrix. A first section of the sheet of fiber reinforcement may only or essentially include a plurality of unidirectional fibers. A second section of the sheet of fiber reinforcement may only or essentially include a plurality multi-directional fibers.

The elastic expansion section may be planar when in a relaxed state.

The first portion of the fiber layer may be arranged in the first plate section to provide the first plate section with a non-variable first lateral width. In addition or alternatively, the second portion of the fiber layer may be arranged in the second plate section to provide the second plate section with a non-variable second lateral width.

The first plate section may have a uniform first thickness as the first plate section extends laterally along a first lateral width of the first plate section. In addition or alternatively, the second plate section may have a uniform second thickness as the second plate section extends laterally along a second lateral width of the second plate section.

A plurality of fibers in the first portion of the fiber layer may project laterally out from the bead into the first plate section. In addition or alternatively, a plurality of fibers in the second portion of the fiber layer may project laterally out from the bead into the second plate section.

The elastic expansion section may be configured to elastically deform to variably increase the lateral width between the first plate section and the second plate section along a longitudinal length of the elastic expansion section.

A lateral width of the bead may change as the bead extends longitudinally along the first portion of the fiber layer and the second portion of the fiber layer.

The bead may project vertically out from the first portion of the fiber layer and the second portion of the fiber layer. A vertical height of the bead may change as the bead extends longitudinally along the first portion of the fiber layer and the second portion of the fiber layer.

The bead may have a curved cross-sectional geometry extending from the first portion of the fiber layer to the second portion of the fiber layer.

The bead may have a polygonal cross-sectional geometry extending from the first portion of the fiber layer to the second portion of the fiber layer.

A plurality of fibers in the fiber layer may extend laterally across the bead into the first portion of the fiber layer and the second portion of the fiber layer.

The elastic expansion section may extend longitudinally along the first plate section and the second plate section. The fibers in the fiber layer may include a first fiber, a second fiber and a third fiber longitudinally between and adjacent the first fiber and the second fiber. The first fiber and the third fiber may be longitudinally separated by a first inter-fiber distance. The second fiber and the third fiber may be longitudinally separated by a second inter-fiber distance that is different than the first inter-fiber distance.

The elastic expansion section may extend longitudinally along the first plate section and the second plate section. The fibers in the fiber layer may include a first fiber, a second fiber and a third fiber longitudinally between and adjacent the first fiber and the second fiber. The first fiber and the third fiber may be longitudinally separated by a first inter-fiber distance. The second fiber and the third fiber may be longitudinally separated by a second inter-fiber distance that is equal to the first inter-fiber distance.

An inner channel of the bead may be completely filled with the elastomeric matrix.

An open volume may be disposed in an inner channel of the bead.

A first section of the fiber layer may be formed by unidirectional fibers. A second section of the fiber layer may be formed by multi-directional fibers.

The aircraft component may also include an anti-erosion elastomeric film bonded to and covering the elastomeric matrix along at least one of the first plate section, the second plate section or the elastic expansion section.

The apparatus may also include a variable area nozzle. The aircraft component may be configured as an inter-nozzle panel seal in the variable area nozzle.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
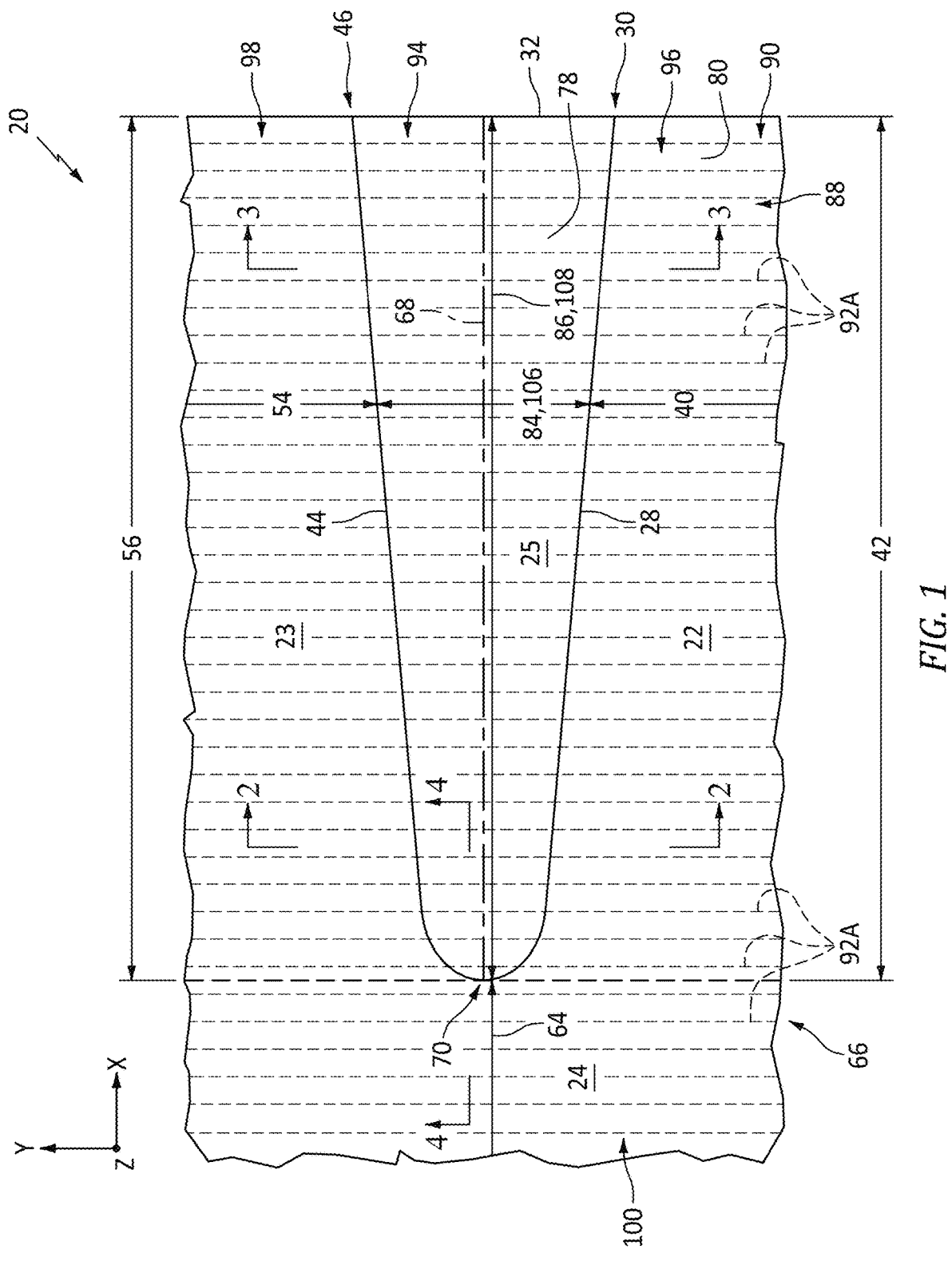
FIG. 1 is a partial schematic illustration of an aircraft component.
Figures 2, 3, 4:
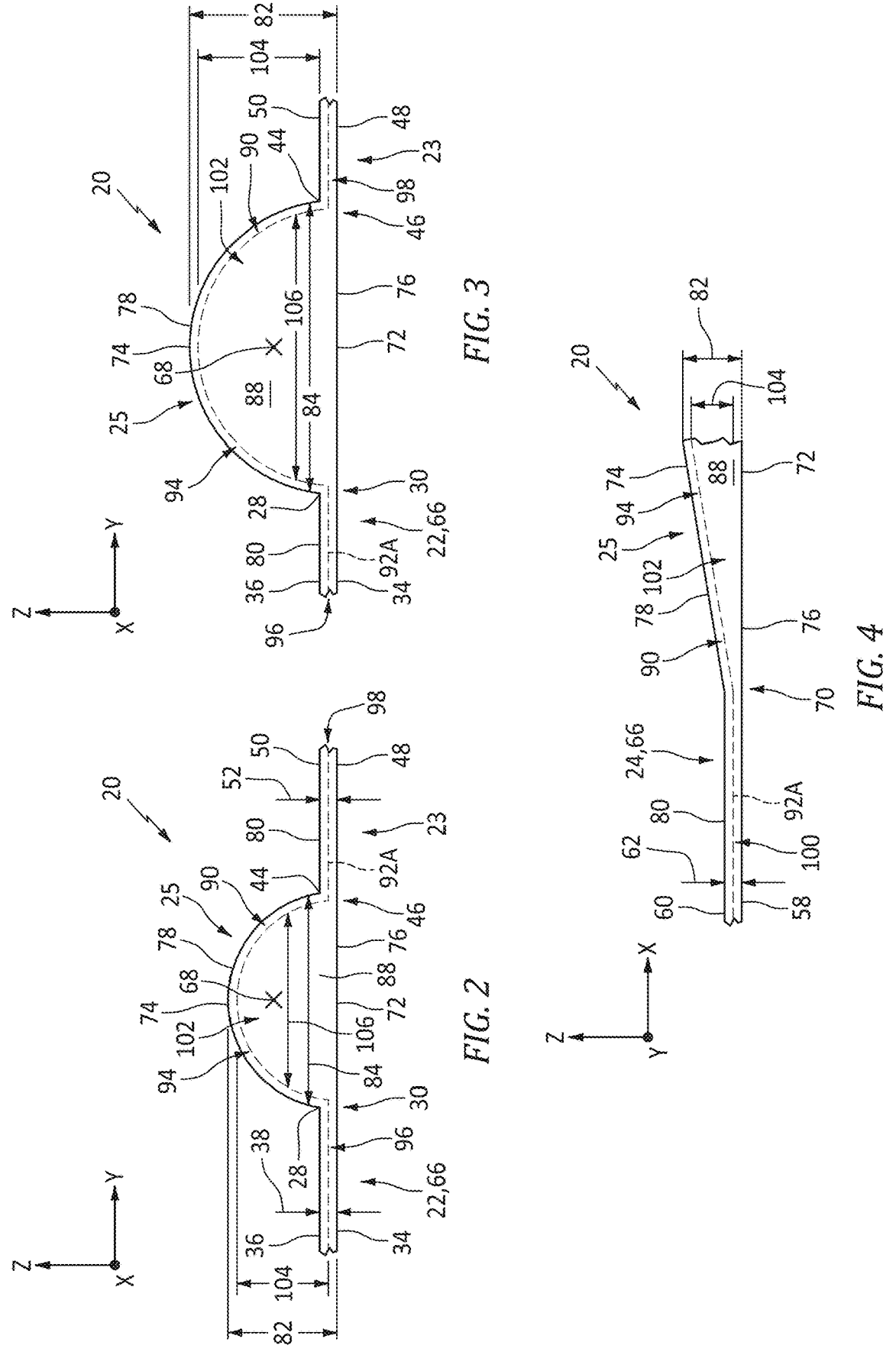
FIG. 2 is a partial cross-sectional illustration of the aircraft component taken along line 2-2 in FIG. 1.
FIG. 3 is a partial cross-sectional illustration of the aircraft component taken along line 3-3 in FIG. 1.
FIG. 4 is a partial side sectional illustration of the aircraft component taken along line 4-4 in FIG. 1.

FIGS. 1-3 illustrate a component 20 for an aircraft. The aircraft may be an airplane, a rotorcraft (e.g., a helicopter), a drone (e.g., an unmanned aerial vehicle (UAV)), or any other manned or unmanned aerial vehicle or system. The aircraft component 20 may be configured as a part of a propulsion system for the aircraft. Alternatively, the aircraft component 20 may be configured as part of an airframe of the aircraft. The aircraft component 20 of FIGS. 1-3 includes one or more plate sections 22-24 and an elastic expansion section 25.

The first plate section 22 may have a sheet-like configuration. The first plate section 22 of FIGS. 1-3, for example, is configured as a planar member of the aircraft component 20. The first plate section 22, however, may alternatively have a slight bend (e.g., curve) in a longitudinal direction (e.g., along an x-axis) and/or in a lateral direction (e.g., along a y-axis).

The first plate section 22 of FIG. 1 extends laterally to a lateral first side 28 of the expansion section 25. This first plate section 22 is connected to (e.g., formed integral with) the expansion section 25 at an intersection 30 between the first plate section 22 and the expansion section 25. The first plate section 22 extends longitudinally along the expansion section 25 from a longitudinal end 32 of the aircraft component 20 to the base plate section 24. This first plate section 22 is connected to (e.g., formed integral with) the base plate section 24 at an intersection between the first plate section 22 and the base plate section 24. Referring to FIG. 2, the first plate section 22 extends vertically (e.g., along a z-axis) between a vertical first side 34 of the first plate section 22 and a vertical second side 36 of the first plate section 22, which defines a vertical thickness 38 of the first plate section 22. This first plate section thickness 38 may be uniform (e.g., constant) as the first plate section 22 extends laterally along its lateral width 40 to the expansion section 25 and/or longitudinally along its longitudinal length 42 (see FIG. 1).

Referring to FIGS. 1-3, the second plate section 23 may have a sheet-like configuration. The second plate section 23 of FIGS. 1-3, for example, is configured as a planar member of the aircraft component 20. The second plate section 23, however, may alternatively have a slight bend (e.g., curve) in the longitudinal direction and/or in the lateral direction.

The second plate section 23 of FIG. 1 extends laterally to a lateral second side 44 of the expansion section 25. This second plate section 23 is connected to (e.g., formed integral with) the expansion section 25 at an intersection 46 between the second plate section 23 and the expansion section 25. The second plate section 23 extends longitudinally along the expansion section 25 from the aircraft component end 32 to the base plate section 24. This second plate section 23 is connected to (e.g., formed integral with) the base plate section 24 at an intersection between the second plate section 23 and the base plate section 24. Referring to FIG. 2, the second plate section 23 extends vertically between a vertical first side 48 of the second plate section 23 and a vertical second side 50 of the second plate section 23, which defines a vertical thickness 52 of the second plate section 23. This second plate section thickness 52 may be uniform (e.g., constant) as the second plate section 23 extends laterally along its lateral width 54 to the expansion section 25 and/or longitudinally along its longitudinal length 56. The second plate section thickness 52 may also be equal to the first plate section thickness 38 (see FIG. 1).

Referring to FIGS. 1 and 4, the base plate section 24 may have a sheet-like configuration. The base plate section 24 of FIGS. 1 and 4, for example, is configured as a planar member of the aircraft component 20. The base plate section 24, however, may alternatively have a slight bend (e.g., curve) in the longitudinal direction and/or in the lateral direction.

The base plate section 24 of FIG. 1 extends laterally along (e.g., laterally overlaps) the first plate section 22, the second plate section 23 and the expansion section 25. The base plate section 24 extends longitudinally to the first plate section 22, the second plate section 23 and the expansion section 25. This base plate section 24 is connected to (e.g., formed integral with) each component section 22, 23, 25 at a respective intersection with that component section 22, 23, 25. Referring to FIG. 4, the base plate section 24 extends vertically between a vertical first side 58 of the base plate section 24 and the vertical second side 60 of the base plate section 24, which defines a vertical thickness 62 of the base plate section 24. This base plate section thickness 62 may be uniform (e.g., constant) as the base plate section 24 extends laterally along its lateral width (not shown) to the expansion section 25 and/or longitudinally along its longitudinal length 64 (see FIG. 1). The base plate section thickness 62 may also be equal to the first plate section thickness 38 (see FIGS. 2 and 3) and/or the second plate section thickness 52 (see FIGS. 2 and 3).

Referring to FIGS. 1-4, the plate sections 22-24 of the aircraft component 20 may be aligned to form a base panel 66 of the aircraft component 20. For ease of illustration, this base panel 66 is shown in FIGS. 2-4 as a flat (e.g., planar) base panel. The base panel 66 of FIG. 1, however, may alternatively be a non-flat base panel; e.g., a two-dimensionally (2D) or three-dimensionally (3D) curved base panel. The base panel 66 and one or more of its plate sections 22-24, for example, may be (e.g., slightly) curved when viewed, for example, in an x-z plane and/or in a y-z plane. Alternatively, at least some of the plate sections 22-24 may respectively form separate panels of the aircraft component 20 where, for example, those plate sections 22-24 are vertically misaligned, angularly offset and/or otherwise positioned relative to one another.

Referring to FIGS. 1-3, the expansion section 25 may be configured as a lateral expansion joint between the first plate section 22 and the second plate section 23. This expansion section 25 extends laterally between and to its first side 28 and its second side 44. The expansion section 25 thereby extends laterally between and to the first plate section 22 at the first plate section-expansion section interface 30 and the second plate section 23 at the second plate section-expansion section interface 46. The expansion section 25 of FIG. 1 also extends longitudinally along a centerline 68 of the expansion section 25/longitudinally along each plate section 22, 23 from the aircraft component end 32 to the base plate section 24 at a base plate section-expansion section interface 70. Referring to FIGS. 2-4, the expansion section 25 extends vertically between a vertical first side 72 of the expansion section 25 and a vertical second side 74 of the expansion section 25.

The vertical first sides 34, 48, 58 and 72 of the aircraft component sections 22-25 may be vertically aligned and form a (e.g., single, continuous) first side surface 76 of the aircraft component 20. For ease of illustration, this first side surface 76 is shown in FIGS. 2-4 as a flat (e.g., planar) surface. The first side surface 76, however, may alternatively be a non-flat surface; e.g., a two-dimensionally (2D) or three-dimensionally (3D) curved surface. The vertical second side 74 of the expansion section 25 of FIGS. 2-4, on the other hand, may be vertically offset from one or more or all of the vertical second sides 36, 50 and/or 60 of the plate sections 22-24. The expansion section 25 of FIGS. 2-4, for example, projects vertically out from each plate section vertical second side 36, 50, 60 to the vertical second side 74 of the expansion section 25. With this arrangement, the expansion section 25 of FIGS. 1-4 forms a protuberance out from the base panel 66 formed by the plate sections 22-24. Here, the vertical second side 74 of the expansion section 25 may form a (e.g., single, continuous) protuberance second side surface 78 of the aircraft component 20, while the vertical second sides 36, 50 and 60 of the plate sections 22-24 may form a (e.g., single, continuous) panel second side surface 80 of the aircraft component 20.

Referring to FIGS. 1-3, the expansion section 25 has a vertical height 82 (e.g., a vertical thickness), a lateral width 84 and a longitudinal length 86. The expansion section height 82 of FIGS. 2 and 3 extends vertically from the vertical first side 72 of the expansion section 25 to the vertical second side 74 of the expansion section 25. The expansion section width 84 of FIG. 1 extends laterally from the lateral first side 28 of the expansion section 25 to the lateral second side 44 of the expansion section 25. The expansion section length 86 extends longitudinally from the aircraft component end 32 to the base plate section 24.

The expansion section height 82 of FIGS. 2-4 may continuously (or intermittently) change along the expansion section width 84 and/or the expansion section length 86. The expansion section height 82 of FIGS. 2 and 3, for example, increases as the expansion section 25 extends laterally from the first plate section 22 to its centerline 68 and/or an apex of the protuberance second side surface 78. The expansion section height 82 then decreases as the expansion section 25 extends laterally from its centerline 68 and/or the apex of the protuberance second side surface 78 to the second plate section 23. Referring to FIGS. 1-4, the expansion section height 82 increases as the expansion section 25 extends longitudinally from (or generally away from) the base plate section 24 to (or generally towards) the aircraft component end 32. However, in other embodiments, the expansion section height 82 may alternatively be uniform along at least a portion or an entirety of the expansion section width 84 and/or along at least a portion or an entirety of the expansion section length 86 (see FIG. 1).

Referring to FIG. 1, the expansion section width 84 may continuously (or intermittently) change along the expansion section length 86. The expansion section width 84 of FIG. 1, for example, increases as the expansion section 25 extends longitudinally from (or generally away from) the base plate section 24 to (or generally towards) the aircraft component end 32. However, in other embodiments, the expansion section width 84 may alternatively be uniform along at least a portion or the entirety of the expansion section length 86.

Referring to FIGS. 1-4, the aircraft component 20 is formed from an elastomeric fiber-reinforced composite material. The aircraft component 20 of FIGS. 1-4, for example, is formed from at least (or only) an elastomeric matrix 88 and a fiber layer 90 (e.g., completely) embedded within the elastomeric matrix 88. For ease of description, the aircraft component 20 and its elastomeric fiber-reinforced composite material may be described below with the single fiber layer 90. It is contemplated, however, the aircraft component 20 and its elastomeric fiber-reinforced composite material may alternatively include a stack of the fiber layers embedded within the elastomeric matrix 88. In such embodiments, the fiber layers may share a common (the same) material makeup and/or configuration (e.g., fiber arrangement, layer geometry, etc.), or one or more of the fiber layers may have a unique material makeup and/or configuration.

The fiber layer 90 is a layer of fiber reinforcement material. More particularly, the fiber layer 90 is a layer of unidirectional fibers 92A (e.g., see FIG. 5A), or a layer of woven or non-woven multi-directional fibers 92A and 92B (generally referred to as "92") (e.g., see FIG. 5B). Note, the fibers 92B (if included) are not shown in FIGS. 1-3 for ease of illustration. Some or all of the fibers 92 within the fiber layer 90 may be a continuous, long strand fiber. Some or all of the fibers 92 within the fiber layer 90, for example, may extend uninterrupted (e.g., completely) across the fiber layer 90. Where the fiber layer 90 includes the unidirectional fibers 92A of FIG. 5A, these fibers 92A are oriented in a generally laterally extending direction within the aircraft component 20; see also FIGS. 1-3. Where the fiber layer 90 includes the multi-directional fibers 92A and 92B of FIG. 5B, one grouping of the fibers (e.g., 92A) are oriented in a generally laterally extending direction within the aircraft component 20; see also FIGS. 1-3. Examples of the fibers 92 include, but are not limited to, glass fibers, carbon fibers, aramid (e.g., Kevlar®) fibers, or any combination thereof.

Referring to FIGS. 1-4, a bead 94 (e.g., a channeled protuberance, a rib, etc.) may be formed in the fiber layer 90 to facilitate formation of the expansion section 25. This bead 94 is formed and extends laterally between a first side portion 96 of the fiber layer 90 and a second side portion 98 of the fiber layer 90. The bead 94 extends longitudinally along centerline 68/the first side portion 96 of the fiber layer 90 and the second side portion 98 of the fiber layer 90 from (or about) the aircraft component end 32 to a base portion 100 of the fiber layer 90. The bead 94 projects vertically out from each adjacent portion 96, 98, 100 of the fiber layer 90.

The bead 94 is disposed in and extends laterally and longitudinally within the expansion section 25. The first side portion 96 of the fiber layer 90 is disposed in and extends laterally and longitudinally within the first plate section 22. The second side portion 98 of the fiber layer 90 is disposed in and extends laterally and longitudinally within the second plate section 23. The base portion 100 of the fiber layer 90 is disposed in and extends laterally and longitudinally within the base plate section 24. With this arrangement, at least some (or all) of the fibers 92A in/making up the bead 94 may extend laterally across the expansion section 25 and its bead 94 and project into (a) the first plate section 22 and its first side portion 96 of the fiber layer 90 and (b) the second plate section 23 and its second side portion 98 of the fiber layer 90.

Referring to FIGS. 2-4, the fiber layer 90 and its bead 94 within the expansion section 25 may be configured to substantially follow a contour of the protuberance second side surface 78 between and to the interfaces 30 and 46. With this arrangement, the bead 94 of FIGS. 2-4 forms an inner channel 102 in the fiber layer 90. This inner channel 102 extends laterally within the bead 94 between opposing lateral side of the bead 94/the laterally opposing side portions 96 and 98 of the fiber layer 90. The inner channel 102 extends longitudinally into the bead 94, along the centerline 68 and the side portions 96 and 98 of the fiber layer 90, from (or about) the aircraft component end 32 to the base portion 100 of the fiber layer 90.

Referring to FIGS. 1-3, the bead 94 has a vertical height 104 (e.g., a vertical thickness), a lateral width 106 and a longitudinal length 108. The bead height 104 of FIGS. 2 and 3 extends vertically from a vertical first side of the side portions 96 and 98 of the fiber layer 90 to a vertical second side of bead 94. The bead width 106 extends laterally between the laterally opposing side portions 96 and 98 of the fiber layer 90. The bead length 108 of FIG. 1 extends longitudinally from (or about) the aircraft component end 32 to the base portion 100 of the fiber layer 90.

The bead height 104 of FIGS. 2-4 may continuously (or intermittently) change along the bead width 106 and/or the bead length 108. The bead height 104 of FIGS. 2 and 3, for example, increases as the bead 94 extends laterally from the first side portion 96 of the fiber layer 90 to the centerline 68 and/or an apex of the bead 94. The bead height 104 then decreases as the bead 94 extends laterally from the centerline 68 and/or the apex of the bead 94 to the second side portion 98 of the fiber layer 90. Referring to FIGS. 1-4, the bead height 104 increases as the bead 94 extends longitudinally from (or generally away from) the base portion 100 of the fiber layer 90 to (or generally towards) the aircraft component end 32. However, in other embodiments, the bead height 104 may alternatively be uniform along at least a portion or an entirety of the bead width 106 and/or along at least a portion or an entirety of the bead length 108 (see FIG. 1).

Referring to FIG. 1, the bead width 106 may continuously (or intermittently) change along the bead length 108. The bead width 106 of FIG. 1, for example, increases as the bead 94 extends longitudinally from (or generally away from) the base portion 100 of the fiber layer 90 to (or generally towards) the aircraft component end 32. However, in other embodiments, the bead width 106 may alternatively be uniform along at least a portion or the entirety of the bead length 108.

Figure 5B:
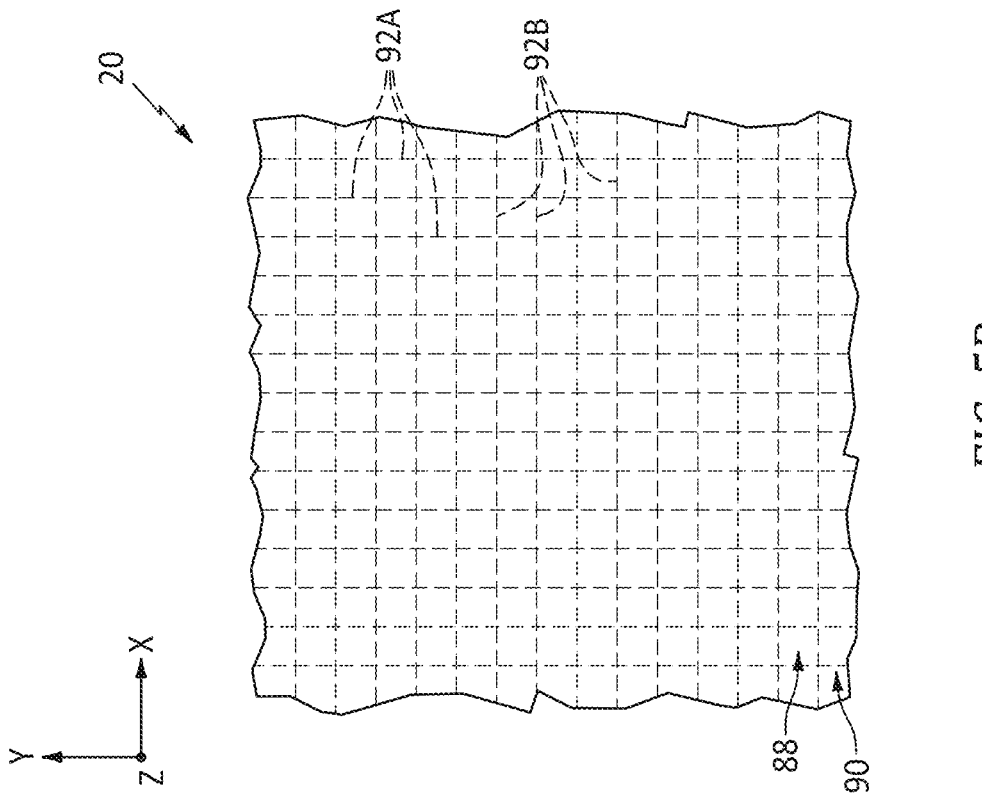
FIGS. 5A and 5B are partial schematic illustrations of a portion of the aircraft component with various fiber arrangements.
Figure 5A:
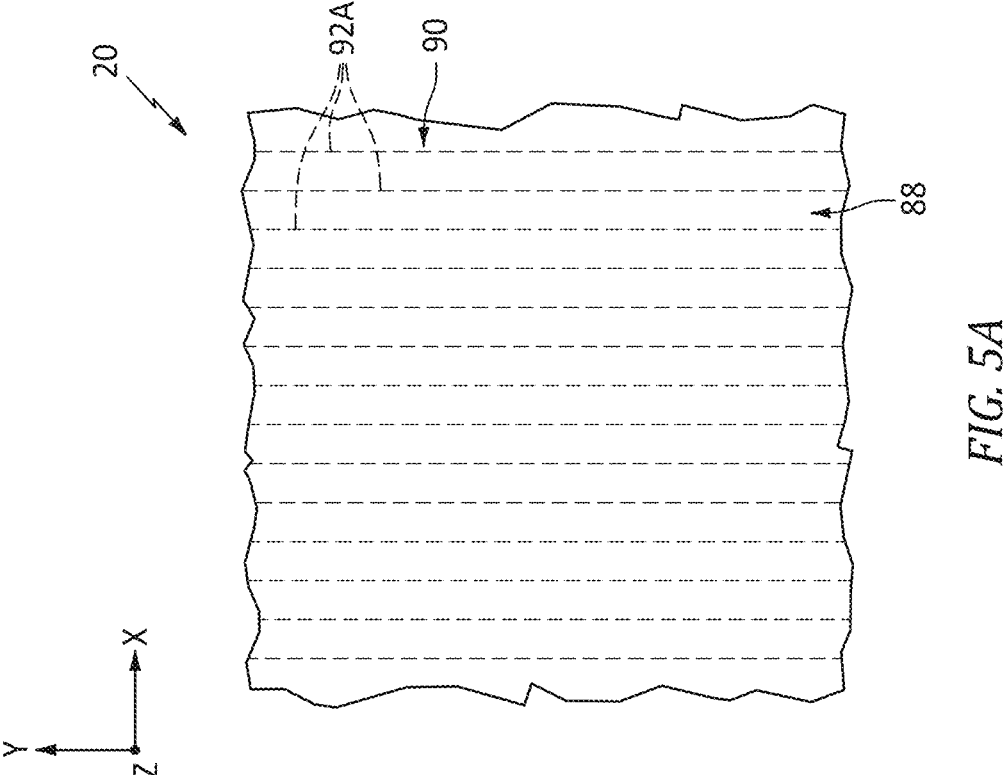

Referring to FIG. 5A, 5B, the elastomeric matrix 88 may be formed by or otherwise include an elastomeric material such as, but not limited to, silicon rubber. The elastomeric matrix 88 may infiltrate and encapsulate the fiber layer 90 and its fibers 92. In addition, referring to FIGS. 2-4, the elastomeric matrix 88 may also (e.g., completely) fill the inner channel 102 of the bead 94. With this arrangement, an inner portion of the expansion section 25 within the inner channel 102 of the bead 94 may not be fiber-reinforced. This inner portion of the expansion section 25 may therefore deform (e.g., laterally) expand without constraint by the fiber layer 90. By contrast, deformation of an outer portion of the expansion section 25 with the bead 94 is laterally constrained by the fiber layer 90.

Figures 6A, 6B:
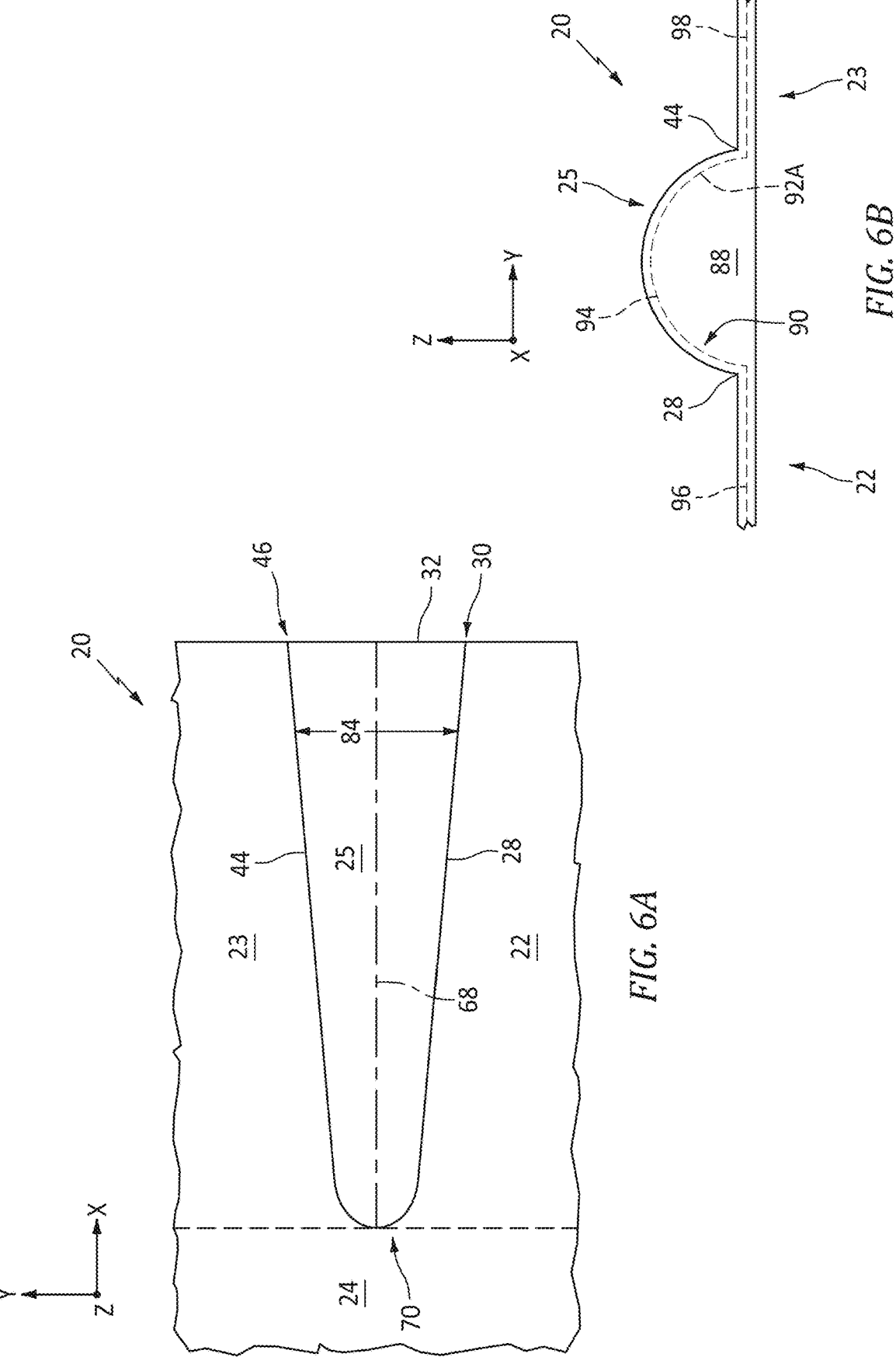
FIG. 6A is a partial schematic illustration of the aircraft component with its elastomeric matrix in a relaxed (or semi-relaxed) state.
FIG. 6B is a partial cross-sectional illustration of the aircraft component of FIG. 6A.
Figures 7A, 7B:
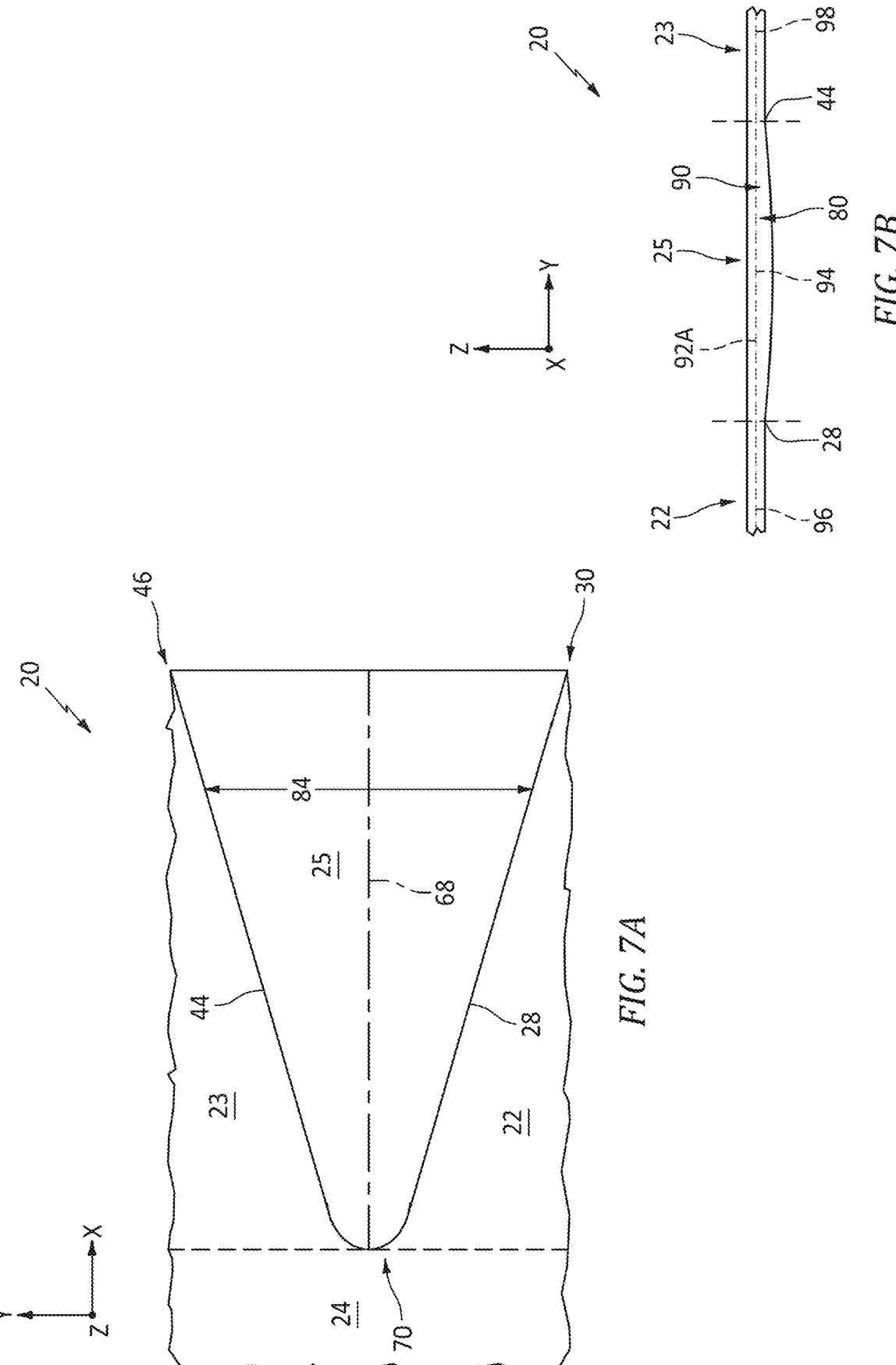
FIG. 7A is a partial schematic illustration of the aircraft component with its elastomeric matrix in a non-relaxed state.
FIG. 7B is a partial cross-sectional illustration of the aircraft component of FIG. 7A.

During operation of the aircraft component 20, the expansion section 25 of FIGS. 1-3 may elastically deform when placed laterally in tension; e.g., when the first plate section 22 and the second plate section 23 are pulled laterally apart from one another. The expansion section 25, for example, may elastically deform from a first configuration (e.g., see FIGS. 6A and 6B) while the elastomeric matrix 88 is in a relaxed (or semi-relaxed) state to a second configuration (e.g., see FIGS. 7A and 7B) while the elastomeric matrix 88 is in a non-relaxed state; e.g., a stretched state/a lateral tension state. As the expansion section 25 deforms, the expansion section width 84 increases facilitating lateral movement of the first plate section 22 and the second plate section 23. Moreover, by varying the configuration of the expansion section 25 and its bead 94 as described above for example, the lateral movement of the plate sections 22 and 23 may be variable tailored. Thus, as the expansion section 25 deforms, the expansion section width 84 may variably increase longitudinally along its centerline 68. Here, the deformation of the expansion section 25 of FIG. 7B is limited by the fiber layer 90 and its fibers 92A. For example, when the fiber layer 90 and its fibers 92A within the bead 94 become flat, the fiber layer 90 may prevent further deformation of the expansion section 25 and lateral movement of the plate sections 22 and 23.

While the fiber layer 90 of FIG. 1 is configured to facilitate deformation and, thus, lateral expansion of the expansion section 25, the fiber layer 90 may be configured in the plate sections 22, 23 and/or 24 to reduce or prevent deformation and/or lateral expansion. Respective fibers 92 in each plate section 22, 23, 24 of FIG. 1, for example, are laterally flat and straight such that those fibers 92 reduce or prevent (e.g., any) deformation and/or lateral expansion of the respective plate section 22, 23, 24. Of course, in other embodiments, it is contemplated that the fiber layer 90 may alternatively be configured to facilitate (e.g., slight) deformation and/or lateral expansion of one or more of the plate sections 22, 23 and/or 24.

Figures 8, 9, 10:
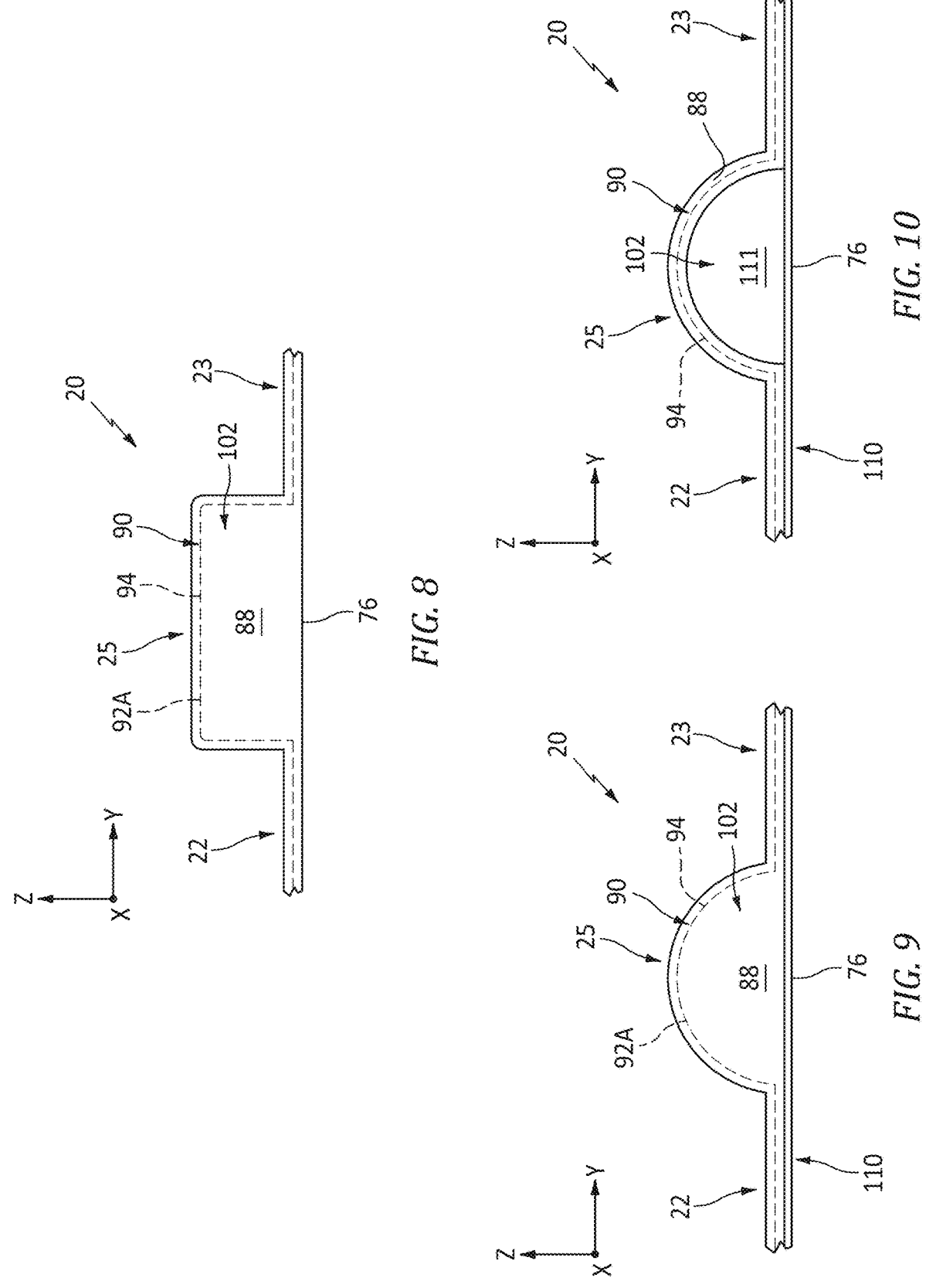
FIG. 8 is a partial cross-sectional illustration of the aircraft component with a polygonal elastic expansion section.
FIG. 9 is a partial cross-sectional illustration of the aircraft component with a protective film.
FIG. 10 is a partial cross-sectional illustration of the aircraft component with the protective film and an open cavity in its elastic expansion section.

Referring to FIGS. 2 and 3, the protuberance second side surface 78 and the bead 94 each have a cross-sectional geometry when viewed in a y-z reference plane; e.g., a plane of FIG. 2, a plane of FIG. 3, etc. In some embodiments, one or both of these cross-sectional geometries may be a curved (e.g., arcuate, splined, etc.) cross-sectional geometry. In other embodiments, referring to FIG. 8, one or both of these cross-sectional geometries may be a polygonal cross-sectional geometry.

In some embodiments, referring to FIGS. 2-4, the elastomeric matrix 88 may be exposed to one or more vertically adjacent environments. In other embodiments, referring to FIGS. 9 and 10, the aircraft component 20 may include an elastomeric protective film 110 (e.g., an anti-erosion film) covering the elastomeric matrix 88. The protective film 110 of FIGS. 9 and 10, for example, is bonded to and covers the elastomeric matrix 88 along the first side surface 76 of the aircraft component 20. Here, the protective film 110 may partially or completely form the first side surface 76 of the aircraft component 20.

In some embodiments, referring to FIGS. 2-4 and 9, the inner channel 102 of the bead 94 may be completely filled with the elastomeric matrix 88. In other embodiments, referring to FIG. 10, the inner channel 102 of the bead 94 may be partially filled with the elastomeric matrix 88; e.g., substantially devoid of the elastomeric matrix 88. With such an arrangement, an empty volume 111 (e.g., an air filled cavity) may extend vertically between and be formed by the elastomeric matrix 88 and the protective film 110 in the expansion section 25.

Figure 11:
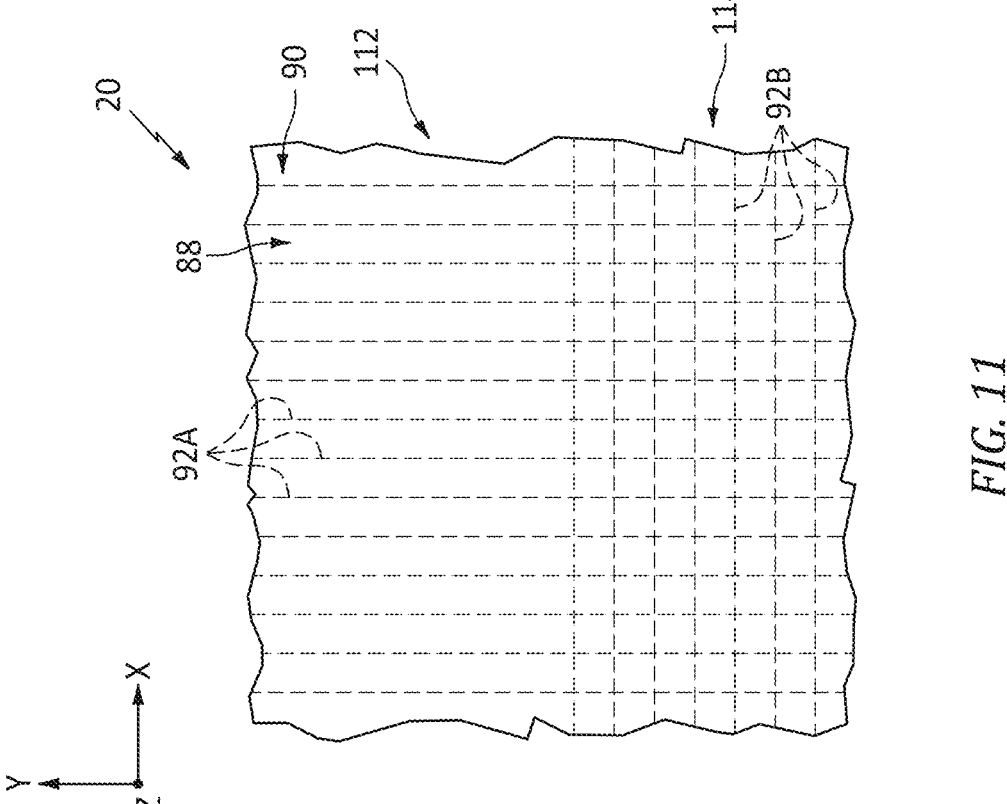
FIG. 11 is a partial schematic illustration of the aircraft component with multiple fiber arrangements.

In some embodiments, referring to FIG. 5A, the fiber layer 90 may be formed entirely of the unidirectional fibers 92A. In other embodiments, referring to FIG. 5B, the fiber layer 90 may be formed entirely of the multi-directional fibers 92A and 92B. In still other embodiments, referring to FIG. 11, the fiber layer 90 may include a first section 112 of the unidirectional fibers 92A and a second section 114 of the multi-directional fibers 92A and 92B. For example, the laterally extending fibers 92A may extend continuously within/through both the first section 112 and the second section 114. However, the longitudinally extending fibers 92B may be arranged (e.g., only) in the second section 114, and not the first section 112. With such an arrangement, the first section 112 may form a portion or an entirety of the bead 94, and the second section 114 may form a portion or an entirety of one or more portions 96, 98 and/or 100 (see FIG. 1) of the fiber layer 90 adjacent the bead 94. The present disclosure, however, is not limited to such an exemplary arrangement. For example, in other embodiments, both the first and the second sections 112 and 114 may form respective portions of the bead 94 to further tailor its deformation.

Figure 12:
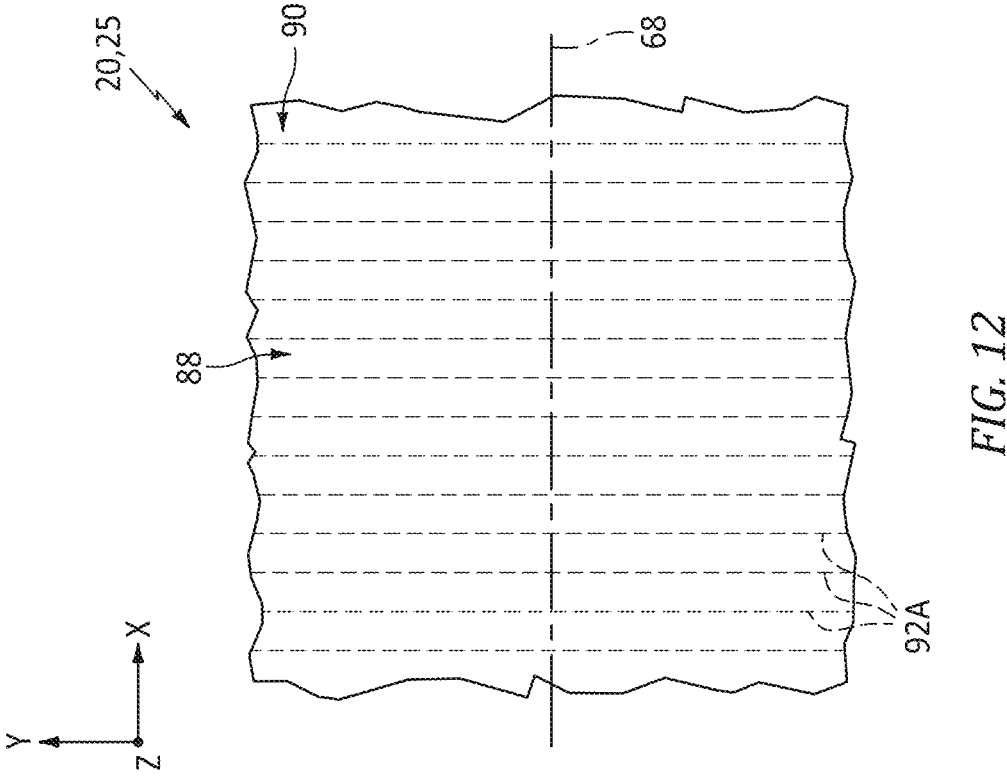
FIG. 12 is a partial schematic illustration of the aircraft component with equispaced fibers.
Figure 14:
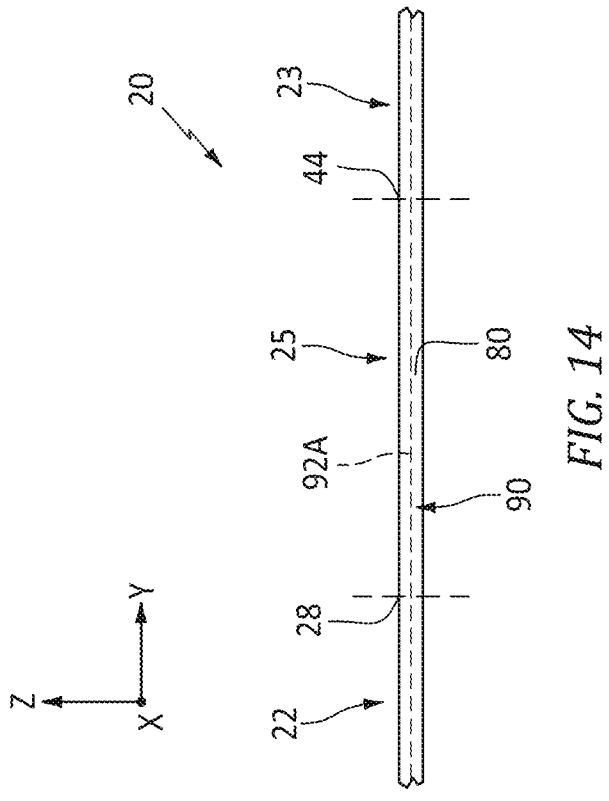
FIG. 14 is a partial cross-sectional illustration of the aircraft component with a planar elastic expansion section in a relaxed state.

In some embodiments, referring to FIG. 12, some or all of the laterally extending fibers 92A may be arranged parallel to one another within one or more of the aircraft component sections 22-25 (section 25 shown in FIG. 12). Moreover, the laterally extending fibers 92A may be equispaced along the centerline 68. In other embodiments, referring to FIG. 13, some or all of the laterally extending fibers 92A at least (or only) in the expansion section 25 may be arranged non-parallel to one another. Each laterally extending fibers $92A_1$-$92A_3$ (generally referred to as "92A") of FIG. 13, for example, has a curved (e.g., arcuate, splined, etc.) trajectory when viewed in an x-y reference plane; e.g., a plane of FIG. 13. Here, a curvature (e.g., radius of curvature) of each laterally extending fibers 92A may be slightly different. The curvature of FIG. 13, for example, may (e.g., slightly) increase as the fiber layer 90 extends longitudinally along the centerline 68. With such an arrangement, the laterally extending fibers 92A may be variable spaced along the centerline 68; e.g., when the expansion section 25 is in its relaxed (or semi-relaxed) state. For example, a longitudinal distance 116 between the longitudinally neighboring (e.g., adjacent) laterally extending fibers $92A_1$ and $92A_2$ is different (e.g., greater) than a longitudinal distance 118 between the longitudinally neighboring (e.g., adjacent) laterally extending fibers $92A_2$ and $92A_3$. Moreover, with such an arrangement of fibers 92, it is contemplated the expansion section 25 may be configured without the bead 94 as shown, for example, in FIG. 14. The expansion section 25 of FIG. 14 therefore may be planar even when in its relaxed (or semi-relaxed) state.

Figure 13:
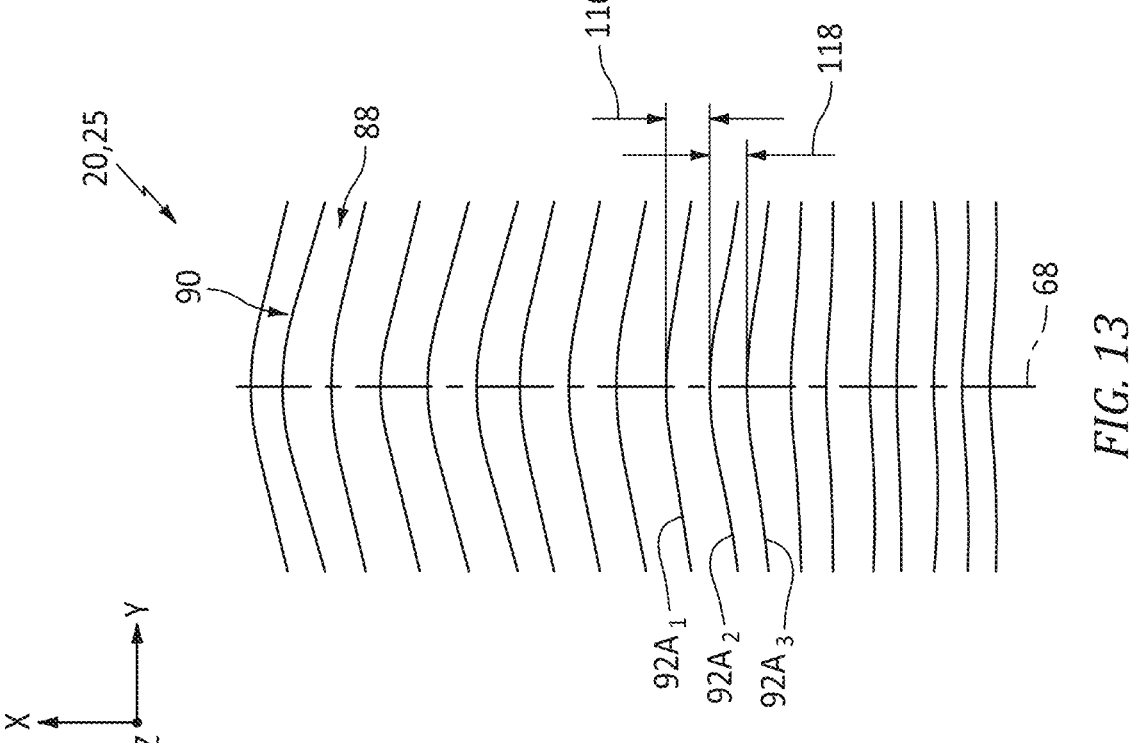
FIG. 13 is a partial schematic illustration of the aircraft component with variable spaced fibers within its elastic expansion section.

In some embodiments, referring to FIG. 13, the longitudinal distance (e.g., 116, 118) between longitudinally neighboring fibers 92A may change as those fibers 92A extend laterally across the expansion section 25. The longitudinal distance 116, 118 of FIG. 13 along the centerline 68, for example, may be greater than that same longitudinal distance 116, 118 at one or both of the interfaces 30 and/or 46. In other embodiments, however, the longitudinal distance may remain uniform as the fibers 92A extend laterally across the expansion section 25.

Referring to FIG. 5A, 5B, each fiber layer 90 and its fibers 92 are generally described above as being (e.g., completely) encapsulated in the elastomeric matrix 88. It is contemplated, however, the fiber layer 90 and its fibers 92 may alternatively be set into the elastomeric matrix 88 such that a portion or all of the fiber layer 90 and some or all of its fibers 92 are exposed along a side surface of the component 20. With such an arrangement, the fiber layer 90 and its fibers 92 may also serve to protect the elastomeric matrix 88.

Figure 15A:
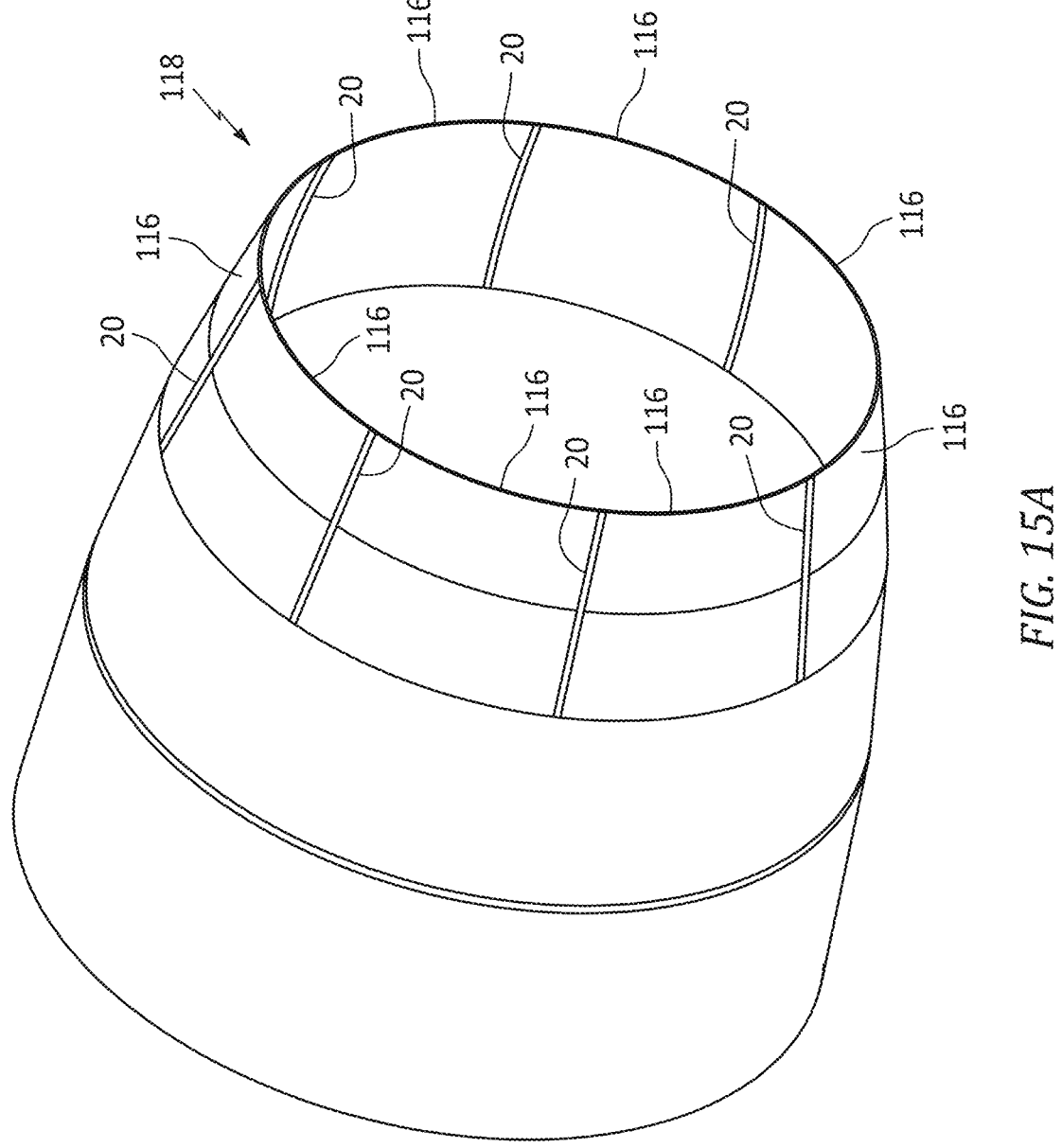
FIGS. 15A and 15B are perspective illustrations of a variable area nozzle for an aircraft propulsion system.
Figure 15B:
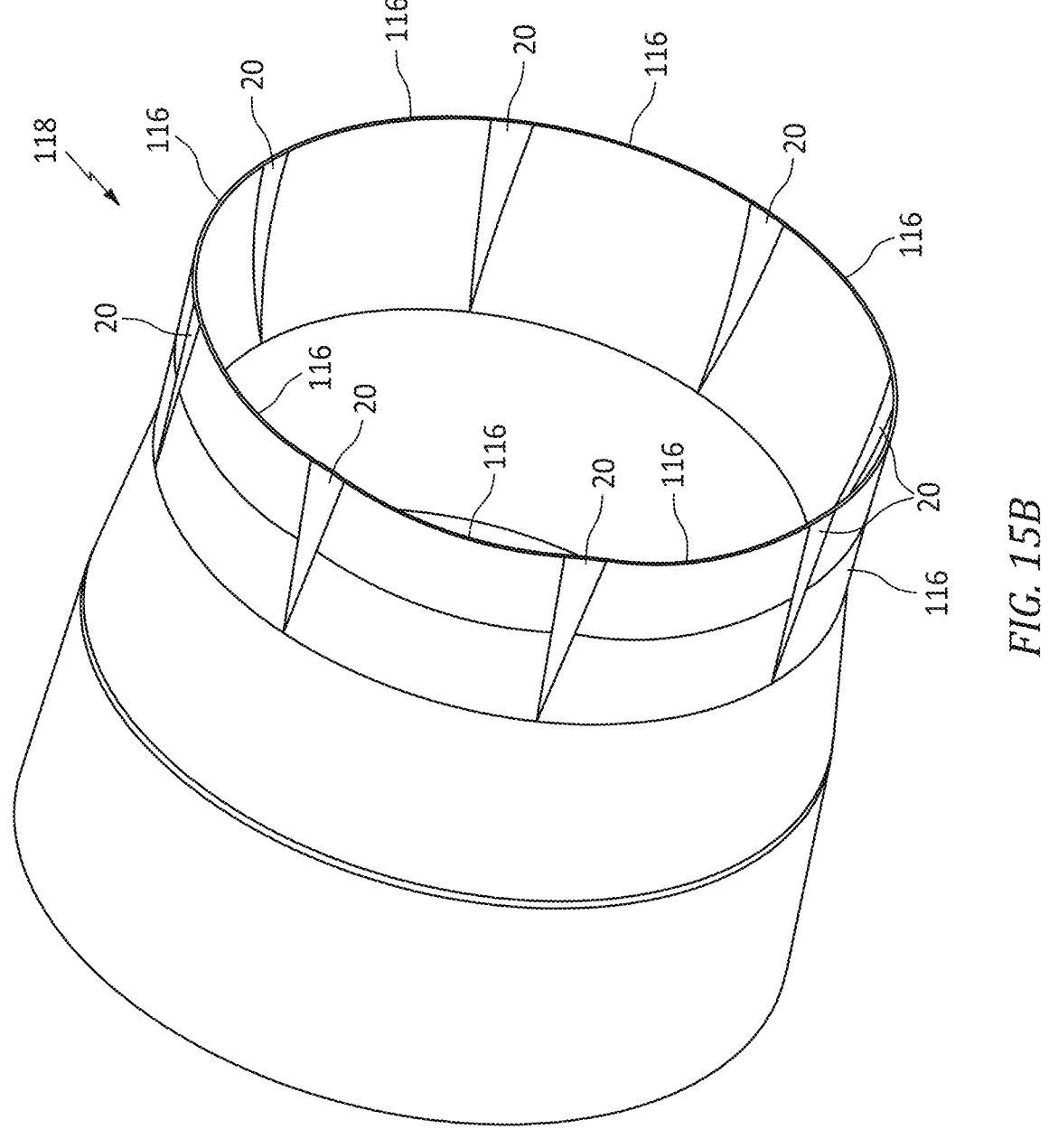

Referring to FIGS. 15A and 15B, the aircraft component 20 may be arranged laterally between and coupled (e.g., mechanically fastened) to a pair of other aircraft components 116. The aircraft component 20, for example, may be configured as an inter-nozzle panel seal, and the aircraft components 116 may be configured as a laterally neighboring pair of nozzle panels. With such an arrangement, the aircraft components 20 and 116 may be included in a variable area nozzle 118 (VAN) for an aircraft propulsion system; e.g., a variable area nozzle for a bypass of a turbofan propulsion system. Of course, it is contemplated the aircraft component 20 may alternatively be configured as part of various other aircraft structures as generally described above.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An apparatus for an aircraft, comprising:
an aircraft component including a first plate section, a second plate section and an elastic expansion section laterally between the first plate section and the second plate section, the elastic expansion section configured to elastically deform to increase a lateral width between the first plate section and the second plate section;
the aircraft component formed from at least an elastomeric matrix and a fiber layer at least partially embedded within the elastomeric matrix, a bead formed in the fiber layer laterally between a first portion of the fiber layer and a second portion of the fiber layer, the first portion of the fiber layer disposed in the first plate section, the second portion of the fiber layer disposed in the second plate section, and the bead disposed in the elastic expansion section;
wherein an inner channel of the bead is completely filled with the elastomeric matrix.

2. The apparatus of claim 1, wherein at least one of
the first portion of the fiber layer is arranged in the first plate section to provide the first plate section with a non-variable first lateral width; or
the second portion of the fiber layer is arranged in the second plate section to provide the second plate section with a non-variable second lateral width.

3. The apparatus of claim 1, wherein at least one of
the first plate section has a uniform first thickness as the first plate section extends laterally along a first lateral width of the first plate section; or
the second plate section has a uniform second thickness as the second plate section extends laterally along a second lateral width of the second plate section.

4. The apparatus of claim 1, wherein at least one of
a plurality of fibers in the first portion of the fiber layer project laterally out from the bead into the first plate section; or
a plurality of fibers in the second portion of the fiber layer project laterally out from the bead into the second plate section.

5. The apparatus of claim 1, wherein the elastic expansion section is configured to elastically deform to variably increase the lateral width between the first plate section and the second plate section along a longitudinal length of the elastic expansion section.

6. The apparatus of claim 1, wherein a lateral width of the bead changes as the bead extends longitudinally along the first portion of the fiber layer and the second portion of the fiber layer.

7. The apparatus of claim 1, wherein
the bead projects vertically out from the first portion of the fiber layer and the second portion of the fiber layer; and
a vertical height of the bead changes as the bead extends longitudinally along the first portion of the fiber layer and the second portion of the fiber layer.

8. The apparatus of claim 1, wherein the bead has a curved cross-sectional geometry extending from the first portion of the fiber layer to the second portion of the fiber layer.

9. The apparatus of claim 1, wherein the bead has a polygonal cross-sectional geometry extending from the first portion of the fiber layer to the second portion of the fiber layer.

10. The apparatus of claim 1, wherein a plurality of fibers in the fiber layer extend laterally across the bead into the first portion of the fiber layer and the second portion of the fiber layer.

11. The apparatus of claim 10, wherein
the elastic expansion section extends longitudinally along the first plate section and the second plate section;
the plurality of fibers in the fiber layer include a first fiber, a second fiber and a third fiber longitudinally between and adjacent the first fiber and the second fiber;
the first fiber and the third fiber are longitudinally separated by a first inter-fiber distance; and
the second fiber and the third fiber are longitudinally separated by a second inter-fiber distance that is different than the first inter-fiber distance.

12. The apparatus of claim 10, wherein
the elastic expansion section extends longitudinally along the first plate section and the second plate section;
the plurality of fibers in the fiber layer include a first fiber, a second fiber and a third fiber longitudinally between and adjacent the first fiber and the second fiber;
the first fiber and the third fiber are longitudinally separated by a first inter-fiber distance; and
the second fiber and the third fiber are longitudinally separated by a second inter-fiber distance that is equal to the first inter-fiber distance.

13. The apparatus of claim 1, wherein
a first section of the fiber layer is formed by unidirectional fibers; and
a second section of the fiber layer is formed by multidirectional fibers.

14. The apparatus of claim 1, wherein the aircraft component further includes an anti-erosion elastomeric film bonded to and covering the elastomeric matrix along at least one of the first plate section, the second plate section or the elastic expansion section.

15. The apparatus of claim 1, further comprising
a variable area nozzle;
the aircraft component configured as an inter-nozzle panel seal in the variable area nozzle.

16. An apparatus for an aircraft, comprising:
an aircraft component including a first plate section, a second plate section and an elastic expansion section laterally between the first plate section and the second plate section, the elastic expansion section extending longitudinally along the first plate section and the second plate section, and the elastic expansion section configured to elastically deform to increase a lateral width between the first plate section and the second plate section when the aircraft component is placed laterally in tension;
the aircraft component formed from at least an elastomeric matrix and a fiber layer at least partially embedded within the elastomeric matrix, the fiber layer including a plurality of fibers extending laterally across the elastic expansion section into the first plate section and the second plate section; and
the plurality of fibers including a first fiber and a second fiber longitudinally adjacent the first fiber, the first fiber longitudinally spaced from the second fiber at a first lateral intersection between the first plate section and the elastic expansion section by a first longitudinal distance, the first fiber longitudinally spaced from the second fiber at a second lateral intersection between the second plate section and the elastic expansion section by a second longitudinal distance, and the first fiber longitudinally spaced from the second fiber at location laterally between the first lateral intersection and the second lateral intersection by a third longitudinal distance that is greater than the first longitudinal distance and the second longitudinal distance;

wherein the elastic expansion section is planar when in a relaxed state.

17. An apparatus for an aircraft, comprising:

an aircraft component including a first plate section, a second plate section and an elastic expansion section laterally between the first plate section and the second plate section, the elastic expansion section configured to elastically deform to increase a lateral width between the first plate section and the second plate section, and the elastic expansion section extending longitudinally along the first plate section and the second plate section;

the aircraft component formed from at least an elastomeric matrix and a fiber layer at least partially embedded within the elastomeric matrix, a bead formed in the fiber layer laterally between a first portion of the fiber layer and a second portion of the fiber layer, the first portion of the fiber layer disposed in the first plate section, the second portion of the fiber layer disposed in the second plate section, the bead disposed in the elastic expansion section, a plurality of fibers in the fiber layer extend laterally across the bead into the first portion of the fiber layer and the second portion of the fiber layer, the plurality of fibers in the fiber layer include a first fiber, a second fiber and a third fiber longitudinally between and adjacent the first fiber and the second fiber, the first fiber and the third fiber longitudinally separated by a first inter-fiber distance, the second fiber and the third fiber are longitudinally separated by a second inter-fiber distance that is different than the first inter-fiber distance.

18. The apparatus of claim 17, wherein an open volume is disposed in an inner channel of the bead.

* * * * *